UNITED STATES PATENT OFFICE.

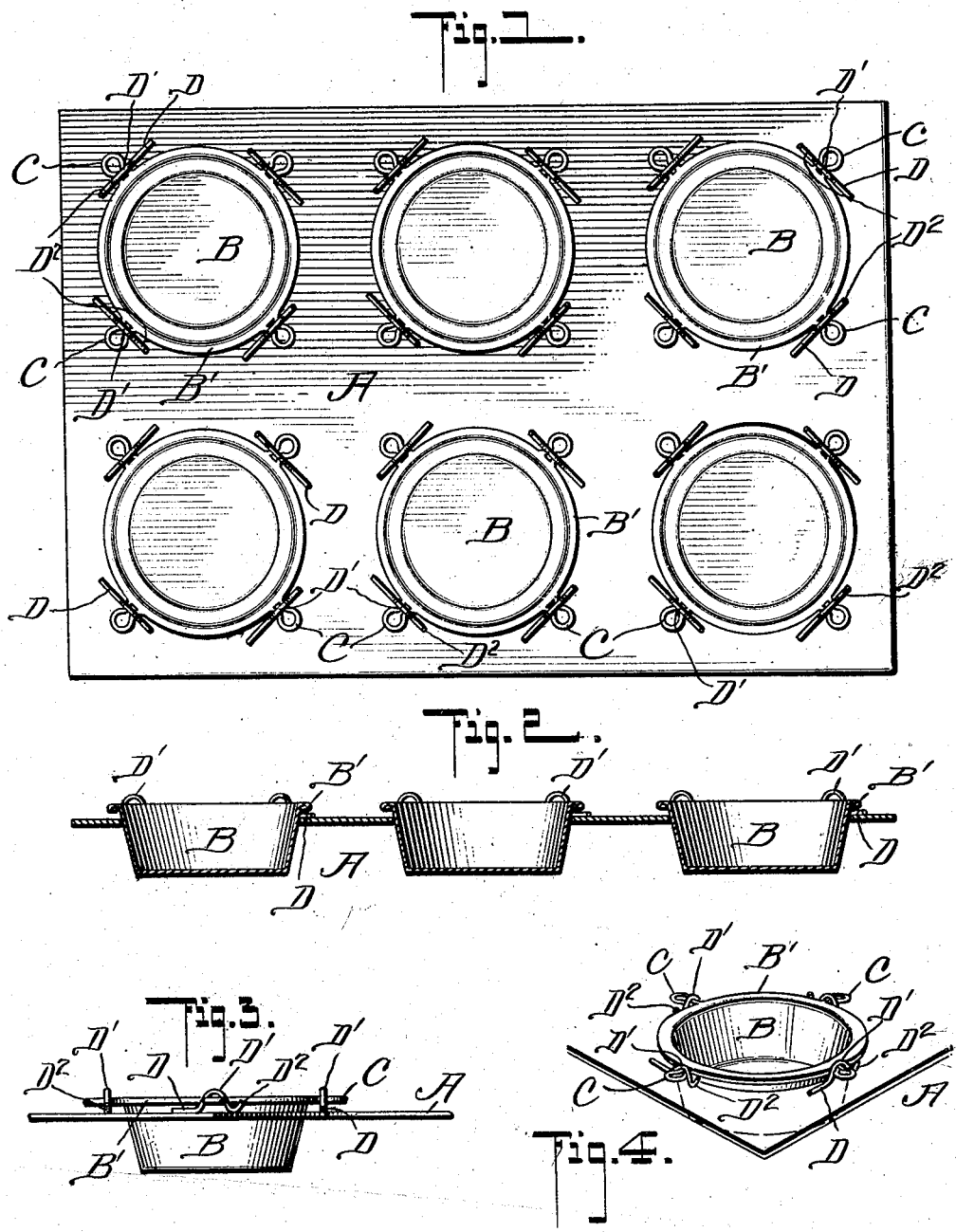

HENRY ROBERT WOLFER, OF SPRINGVALLEY, ILLINOIS.

MUFFIN-PAN.

No. 924,209.  Specification of Letters Patent.  Patented June 8, 1909.

Application filed December 6, 1907. Serial No. 405,378.

*To all whom it may concern:*

Be it known that I, HENRY ROBERT WOLFER, a citizen of the United States, residing at Springvalley, in the county of Bureau and State of Illinois, have invented a new and useful Improvement in Muffin-Pans, of which the following is a specification.

This invention relates generally to muffin pans and more particularly to certain improvements whereby the pans proper can be quickly and easily detached and removed from the main frame.

The object of the invention is to construct a utensil in such a manner that one or more of the pans can be used either with or without the frame.

The invention consists also in certain details of construction, hereinafter fully described and pointed out in the claim.

In the drawing forming a part of this specification:—Figure 1 is a top plan view of my improved form of muffin pan. Fig. 2 is a vertical longitudinal section. Fig. 3 is an edge view taken from one corner, and Fig. 4 is a detail perspective view of said corner.

When carrying out my invention I employ a flat plate of sheet metal A, which has a plurality of circular openings made therein, said openings being preferably arranged in rows as shown.

B indicates the pans proper, each one being slightly tapered after the usual manner of pans of this kind and at their upper edges the pans are provided with an outwardly projecting flange B'. The pans, it will be understood, are inserted in the openings and are of such size and shape as to fit snugly therein. For the purpose of securely holding them in place, each pan is provided with one or more lateral projections C, said projections being preferably formed upon the flange and are made in the form of a loop or ear as shown.

Clips D are arranged upon the upper face of the plate A adjacent the circular openings, said clips being bowed as shown at D' to fit over the projection C, the free end D² being curved upwardly to facilitate the passage of the ear or loop of the said clip.

It will be understood that there is one clip for each ear or projection carried by each pan. The pans are inserted in the openings pressed down as far as they will go, the ears or loops being arranged between the clips and then by giving the pan a quarter turn the ears or loops will be forced beneath the clips, and thereby securely locked in connection with the plate. When it is desired to remove them, the operations just described, are reversed.

By having the pans proper readily detachable it will be understood that one or more of them can be used at a time and it often happens that it is not desired to use all the pans and in case all the pans are placed in the oven and only a few filled, those which are not filled become burned and discolored. With my construction of device this objection is avoided as the empty pan can be quickly removed from the plate and only the full pan inserted. Furthermore, the muffin or other article can be removed easier from the detached pan than it can be removed from a pan in series.

Having thus fully described my invention, what I claim as new and desire to secure by Letters Patent is:—

In a device of the kind described, the combination with a plate provided with a plurality of openings, of pans adapted to fit in said openings having flanged upper edges provided with laterally projecting ears or loops and spring clips carried by the plate adapted to fit over said ears or loops, said clips being provided with upwardly curved ends and bowed portions, for the purpose described.

HENRY ROBERT WOLFER.

Witnesses:
 C. N. HOLLERICH,
 JOHN J. SWEENEY.